United States Patent
Machado et al.

(10) Patent No.: US 7,354,678 B2
(45) Date of Patent: Apr. 8, 2008

(54) FE-LI-Al ANODE COMPOSITE AND THERMAL BATTERY CONTAINING THE SAME

(75) Inventors: Dario Machado, Upper Nazareth (IL); Shlomo Golan, Haifa (IL); Igal Londner, Haifa (IL); Eli Jacobsohn, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 376 days.

(21) Appl. No.: 10/257,838

(22) PCT Filed: May 3, 2001

(86) PCT No.: PCT/IL01/00394

§ 371 (c)(1),
(2), (4) Date: Apr. 22, 2003

(87) PCT Pub. No.: WO01/84650

PCT Pub. Date: Nov. 8, 2001

(65) Prior Publication Data

US 2003/0175592 A1    Sep. 18, 2003

(30) Foreign Application Priority Data

May 4, 2000    (IL)    ..................................... 135981

(51) Int. Cl.
*H01M 4/36* (2006.01)
*H01M 4/48* (2006.01)
*H01M 6/20* (2006.01)
*H01M 6/36* (2006.01)
*H01M 6/18* (2006.01)

(52) U.S. Cl. .................. 429/107; 429/112; 429/321
(58) Field of Classification Search ................ 429/104, 429/107, 188, 321
See application file for complete search history.

(56) References Cited

U.S. PATENT DOCUMENTS

| 4,056,885 | A | * | 11/1977 | Rao ........................... 29/623.1 |
| 4,158,720 | A |   | 6/1979  | Kaun |
| 4,221,849 | A | * | 9/1980  | Harney ....................... 429/112 |
| 4,781,756 | A | * | 11/1988 | Frianeza-Kullberg et al. 75/745 |

FOREIGN PATENT DOCUMENTS

| JP | 01144567 | 6/1989 |
| JP | 03112069 | 5/1991 |

* cited by examiner

*Primary Examiner*—Patrick Joseph Ryan
*Assistant Examiner*—Ben Lewis
(74) *Attorney, Agent, or Firm*—Cooper & Dunham LLP

(57) ABSTRACT

A solid anode composite material for use in thermal batteries that comprises about 65-85% by weight (about 34 to 40 atom percent) particulate iron, about 15-35% by weight (50 to 70 atom percent) lithium, and about 0.1-10% by weight (1.7 to 2.3 atom percent) aluminum. Lithium and Aluminum are only slightly or not alloyed with the particulate iron. The iron and/or the aluminum may be in the form of a powder. The aluminum may be in the form of lithium-aluminum alloy.

10 Claims, 6 Drawing Sheets (a)

(b)

(a)

(b)

US 7,354,678 B2

FE-LI-AL ANODE COMPOSITE AND THERMAL BATTERY CONTAINING THE SAME

BACKGROUND OF THE INVENTION

Thermal batteries are thermal activated, primary reserve, hermetically sealed power sources, generally consisting of series or series-parallel arrays of cells. Each cell is comprised of an anode, an electrolyte-separator that is solid and no-conductive at room temperatures, a cathode and pyrotechnical means. The cell is activated by providing sufficient heat to melt the electrolyte.

A variety of electrochemical systems are known for use in thermal cells. The electrolytes are generally mixtures of alkali metal halides, most commonly eutectic mixtures of LiCl—KCl (melting at about 352° C.) and LiCl—LiF—LiBr (melting at about 440° C.) although other fusible salt mixtures have been used, such as alkali metal thiocyanates. etc. Common cathode materials, among others, are iron pyrite, cobalt sulfide, calcium chromate, copper chloride and copper oxide.

Typically, pure lithium metal is used as an anode, however, due to its high reactivity, some prominent disadvantages exist, among them is the formation of lithium nitride. This compound serves as a catalyst for its continuous formation, in particular, during nitrogen leakage into the battery during aging period, resulted in a gradual conversion of the metallic lithium anode into said nitride. This phenomenon has been found to seriously degrade the life time of a thermal battery. This problem of lithium nitride formation was never totally solved and elimination of this compound, remained a source of concern throughout the years.

Due to lithium's high reactivity the anode preparation requires very difficult maintenance of high purity argon gas to prevent lithium nitride formation. Even with expensive appropriate equipment, the lithium-based material, once it is formed, becomes tarnished after cooling. The mat gray film formed as a result of the precipitation of lithium nitride and other impurities (R. Szwarc and S Dallek, "The Li(B) Ingot Preparation Scale-Up Study—Final Report", GEPP-TM-645, General Electric Company, 1982).

There are two reasons for lithium nitride formation during lithium melting. One is that a "nitrogen free" atmosphere generally comprises about 1 ppm of nitrogen. This concentration, although very small, cannot be considered as a "free" or "zero" nitrogen atmosphere. Said small amount of nitrogen is enough for reacting with lithium to produce an impurities amount of lithium nitride in the lithium-based anode material. Further, nitride impurities are always present in the lithium raw material. Such impurities, even in a very small quantity, are inevitable due to the existence of an eutectic composition between lithium and lithium nitride.

The eutectic composition comprises 0.068% mol nitrogen {P. Hubberstey, R. J. Pulham and A. E. Thunder, "Depression of the freezing point of lithium by nitrogen and by hydrogen", J. Chem. Soc. Faraday Trans., 1 [72] 431-435 (1976)} and always causes lithium raw material to contain lithium nitride impurity.

U.S. Pat. No. 3,930,888 discloses active anode metals, including alkali metals, alkaline earth metals or alloys thereof that melt below the cell operating temperature, or, for most purposes, below about 400° C., preferably lithium or an alloy of lithium and calcium. Use of liquid lithium anode in thermal batteries provides a number of advantages among them are its capability of providing high voltage, power density and energy density.

The active anode metal is carried by a foraminous metal substrate that is wet by the molten anode metal and is substantially inert to electrochemical or other reaction in the particular cell system used. The substrate is filled with active anode metal, most suitably by dipping the substrate in molten anode metal, withdrawing the substrate and then cooling it below the melting point of the anode metal; when the anode metal is melted on activation of the cell it will then wet and fill the substrate.

The anode housing comprises an impervious inert metal portion and a porous refractory fibrous portion. The metal portion is in electrical contact with the anode metal and may be of any solid metal substantially inert to the other cell components with which it may contact, preferably nickel, stainless steel or iron. The porous portion (dry asbestos fibers and/or any insoluble, inorganic, non-metallic fibers of high melting point that is infusible during operation of the cell, such as refractory or ceramic fibers, either acidic, basic or amphoteric, may be used) of the housing is in tight engagement with the entire periphery of the metal portion of the housing in order to prevent leakage of the molten anode metal along the metal housing surface to the exterior of the housing, that would cause shorting or other premature failure.

A major disadvantage of this anode lies in the reactive nature of lithium and its low melting point (about 180° C.) which may result in a leakage of the molten metal, and consequently may cause short circuits and premature failure in such batteries.

U.S. Pat. No. 4,221,849 relates to an anode material comprising a pyrometallurgically combined iron-lithium anode for use in lithium anode thermal batteries. The ratio of lithium to iron is about 15% to 35%. In these ratios, the iron particles are held together by the surface tension of the lithium rather than being alloyed thereto. The lithium is heated to about 500-600° F. and the iron added in particulate form while stirring the molten mixture. The iron-lithium anode disk is positioned in a metal cup by means of an inert insulator or separator ring preferably, made of Fiberbrax®. The electrolyte, normally in the form of a wafer, is positioned adjacent to the separator in the cup.

It has been found that an activation of thermal batteries assembled with said iron-lithium anodes formed a noise of a few seconds duration, with peak-to-peak values of greater than 0.5 volts (between 3 and 15 KHz). The noise which is greatly exaggerated in batteries operating in cold conditions as compared to those operating in warm or hot conditions, has found to seriously degrade the final activation rate of these batteries.

U.S. Pat. No. 4,675,257 which uses the same anode of the U.S. Pat. No. 4,221,849 comprises a metal cup and a metal screen interposed between the metal cup and anode composite material. The positioning of a metal screen between the metal cup and the anode composite material together with removal of the fiberfrax separator resulted in the reduction and elimination of activation noise and improved the electrical characteristics of the battery.

The above three US patents have the major disadvantage of undesired development of lithium nitride as discussed hereinabove.

U.S. Pat. No. 4,781,756 teaches a process for the removal of lithium nitride from high purity lithium metal by adding a stochiometric amount of aluminum to liquid lithium metal containing lithium nitride (at a temperature between the melting point of lithium and 300° C.) to react with the lithium nitride, in an inert, nitrogen-free, atmosphere to form aluminum nitride, and subsequently separating the aluminum nitride from the liquid lithium metal by settling and filtering the mixture using a 0.5 µm filter.

U.S. Pat. No. 5,019,158 deals with a process for separating calcium and nitrogen from lithium, in which alumina is added to a molten lithium and reacts to produce aluminum and lithium oxide. The aluminum reacts with the nitrogen in the lithium to produce insoluble aluminum nitride, while the lithium oxide reacts with the calcium present to produce insoluble calcium oxide and lithium. The insoluble calcium oxide and aluminum nitride may then be separated from the molten lithium (for example, by filtration). This operation is preferably takes place at temperatures between 200° C. and 250° C.

The latest two discussed patents (U.S. Pat. Nos. 4,781,756 and 5,019,158), suffer from the disadvantage of having a filtration step which is very difficult to perform whenever high viscous mixtures exist. More specifically, they include a filtration step to remove the insoluble oxides and nitrides from the molten lithium metal. As a result, they cannot been used in the process for production of iron-lithium anodes, due to the fact that the pyrometallurgically combinations of iron and lithium (15-35wt % Li) form highly viscous mixtures that are not filterable.

U.S. Pat. No. 4,158,720 discloses a lithium-aluminum-iron alloy for use in a negative electrode within a secondary electrochemical cell. It was found that such electrodes exhibit increased electrode potential over that of electrodes containing only lithium-aluminum alloys. The anode composition comprises about 5-50 atom percent lithium and about 50-95 atom percent alloy of aluminum and iron. The aluminum and iron alloy includes about 20-35 atom percent iron.

The aluminum-iron alloy ($Fe_2Al_5$), when saturated with lithium, provides an increased lithium activity and consequently increased electrode voltage over that of a comparable lithium-aluminum alloy. The electrode material is prepared by first providing an alloy of aluminum and iron and then electrochemically depositing lithium into a porous mass containing that alloy.

There is a major drawback to this US patent that should be discussed. The anode material consists of an alloyed lithium compound (Li—Al—Fe alloy), and consequently suffers from lithium not being present in an active metal form. The absence of lithium in an active metal form resulted in a substantial reduction in the anode's potential.

SUMMARY OF THE INVENTION

It is the object of present invention to provide a new thermal battery containing a new Fe—Li—Al anode composite which includes the advantages of lithium in an active metal form without sacrificing for lithium propensity of being nitrided in the presence of nitrogen.

It is a further object of present invention to provide a thermal battery containing a new Fe—Li—Al anode composite having longer shelf life with improved characteristics. More specifically, the thermal battery containing the new anode of the invention shows no reduction in voltage or power as a result of formation of lithium nitride.

The anode composite of present invention comprises as much as 50 to 70 atom percent of active lithium in metal form (compared to only 5 to 50 atom percent of active lithium in the anode composite of the U.S. Pat. No. 4,158,720 discussed above). In addition, the anode of the present invention comprises about 34 to 40 atom percent of iron and only 1.7 to 2.3 atom percent of aluminum (compared to 10 to 33 atom percent of iron and as much as 33 to 76 atom percent of aluminum in the anode composite of the above mentioned US patent). Furthermore, the lithium and aluminum components in the anode composite of present invention are not in an alloy form but rather in a metal form, pyrometallurgically combined with iron powder, yielding the highest possible potential the lithium-based anode could provide. However, a minor proportion of lithium and aluminum may be in an alloy form with iron powder.

Comparing U.S. Pat. No. 4,158,720 with the present invention reveals a significant difference in the process of obtaining the Fe—Li—Al anode composite. Whereas the process in the US patent uses an Al—Fe alloy of various compositions (such as, $Fe_2Al_5$, $FeAl_3$ and $FeAl_2$), as a component of the anode, in the process of the present invention iron and aluminum are used as metal powders, thereby eliminating an additional step of production of said alloys, which needs very high operational temperatures (about 1200° C.). Furthermore, whereas the process of the U.S. Pat. No. 4,158,720 applies an electrochemical deposition of lithium in the formation of lithium alloy, the process of the present invention applies an addition of lithium in a particulate metal form, thus enabling keeping the lithium in the preferred metal form.

Yet a further object of present invention is to provide an iron-lithium-aluminum anode composite, in which whenever lithium nitride is formed it is immediately reacted with aluminum, to be present in a metal form or in an alloy form (such as Li—Al alloy). It should be pointed out, however, that metals other than Al, as well (for example, gallium) may react with lithium nitride and may substitute for aluminum in the anode composite. Suitable metals are those the nitrides of which are thermodynamically more stable than lithium nitride. The Li—Al melt may pyrometallurgically combine with a particulate metal selected from the group containing iron, stainless steel, nickel and nichrome. Consequently, the iron in the Fe—Li—Al anode of present invention, may be replaced by any of said metals.

In a preferred embodiment of present invention the anode configuration comprises a metal cup containing the iron-lithium-aluminum anode in which a metal screen is interposed between the metal cup and the anode composite material, based on the assembly described in the U.S. Pat. No. 4,675,257 discussed above.

The ratio of iron- lithium-aluminum anode composite of present invention is about 65-85% by weight (about 34 to 40 atom percent) iron, about 15-35% by weight (50 to 70 atom percent) lithium and about 0.1-10% by weight (1.7 to 2.3 atom percent) aluminum.

In a preferred mode, the lithium is heated to about 300-400° C. and the aluminum, in a metal or in lithium-aluminum alloy form, is added in a particulate form while stirring the molten mixture for about 30 minutes or longer to allow the aluminum to react with lithium nitride. Following aluminum addition, and without removing aluminum nitride or unreacted aluminum, iron powder is added while stirring the molten mixture for about 30 minutes or longer, to obtain an homogenous mixture. The mixture of lithium, aluminum and wetted iron powder is cooled in previously heated graphite molds. The entire process is conducted in a rare gas inert atmosphere, preferably argon.

It should be pointed out that despite the aluminum addition and consequently, the formation of aluminum nitride, the anode composite material retains the essential characteristics of lithium and it is easily rolled and shaped.

Unlike conventional thermal battery's lithium and lithium-iron anodes, the anode composite material of present invention, has reduced propensity of being nitrided in contact with nitrogen atmospheres. The anode of present invention thus maintains its active lithium in a metal form during the required prolonged storage periods of thermal batteries, while at the same time, blocking the lithium nitride formation.

Furthermore, it was unexpectedly found that the addition of aluminum in a lithium-aluminum alloy form to the anode composite reduces noise levels during thermal battery activation. It has been speculated that the reduced levels of activation noise of battery of present invention is due to lower surface tension value of lithium-aluminum melt comparing to the surface tension of lithium melt.

BRIEF DESCRIPTION OF THE DRAWINGS

(FIGS. 3 and 4, respectively). The upper and lower curves represent the voltage output of 11 cells and 6 cells battery section, discharged at an average current density of 530 mA/cm$^2$ and 770 mA/cm$^2$, respectively.

EXAMPLES

Figure 1:
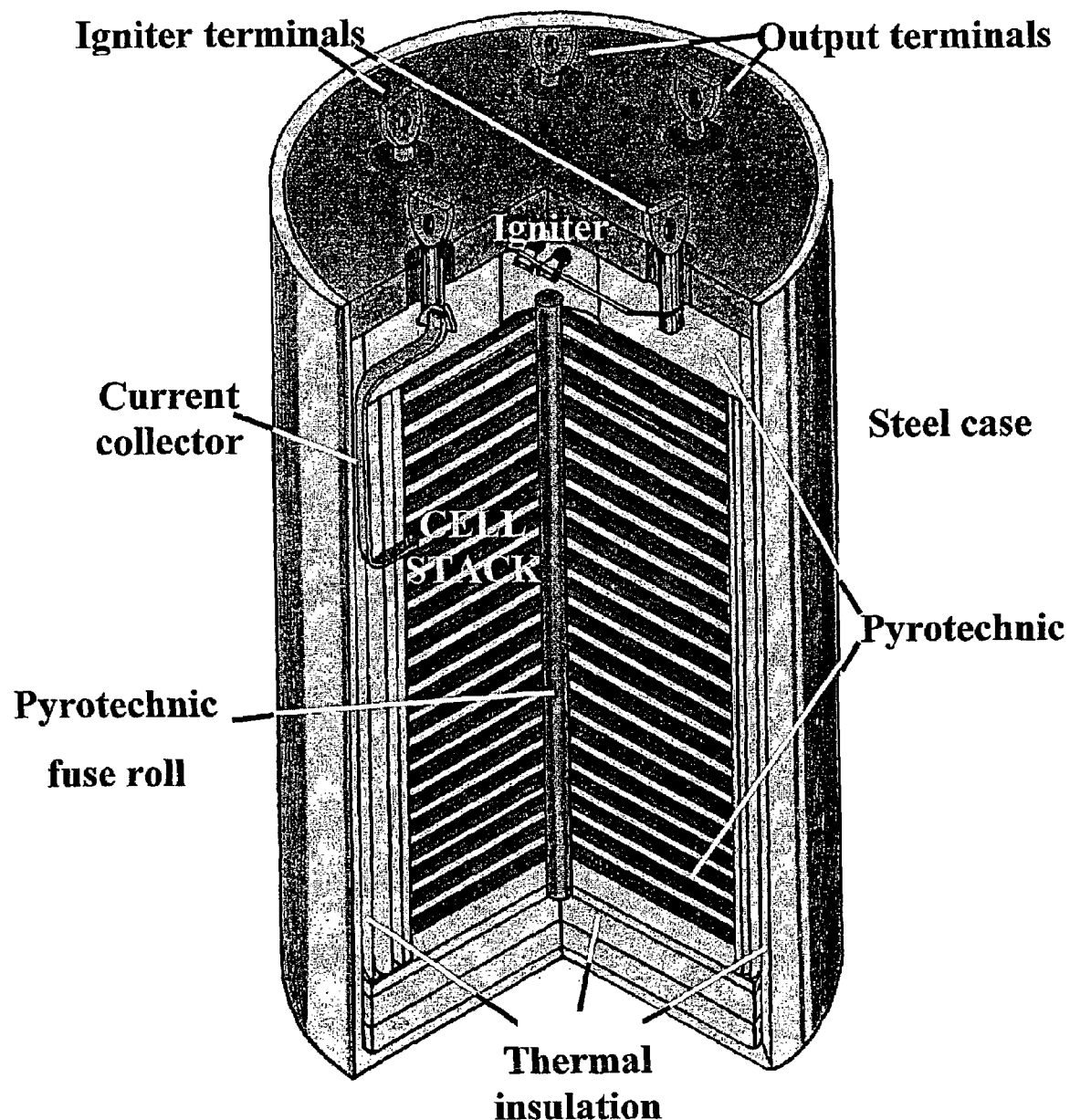
FIG. 1 is a general view of a common thermal battery comprising a stacked array of electrochemical cells. It should be pointed out that options of using mechanical instead of electrical activation, and using pyrotechnic fuse strip instead of pyrotechnic fuse oil are not shown in the figure.
Figure 2:
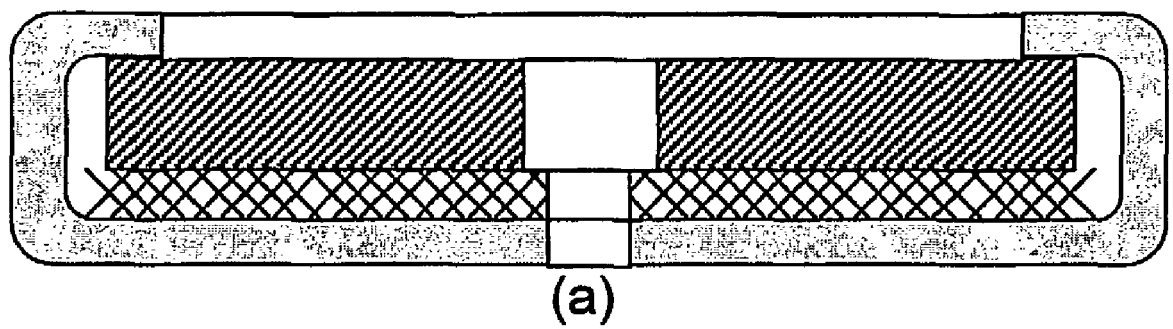
FIG. 2 is an example of an anode assembly suitable for use in the present invention, as was demonstrated in U.S. Pat. No. 4,675,257. Same assembly without the center opening may be used, as well.
Figure 2:
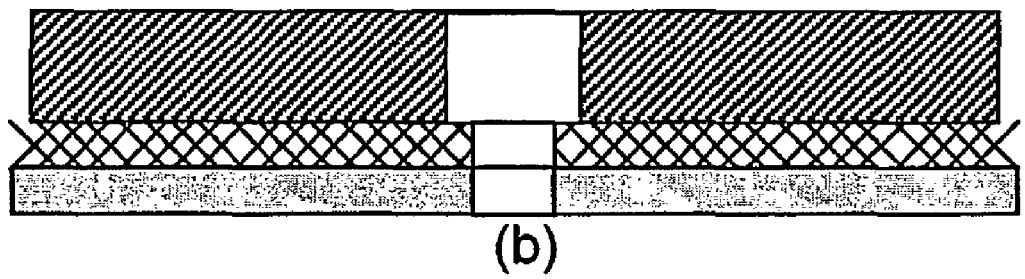
Figure 3:
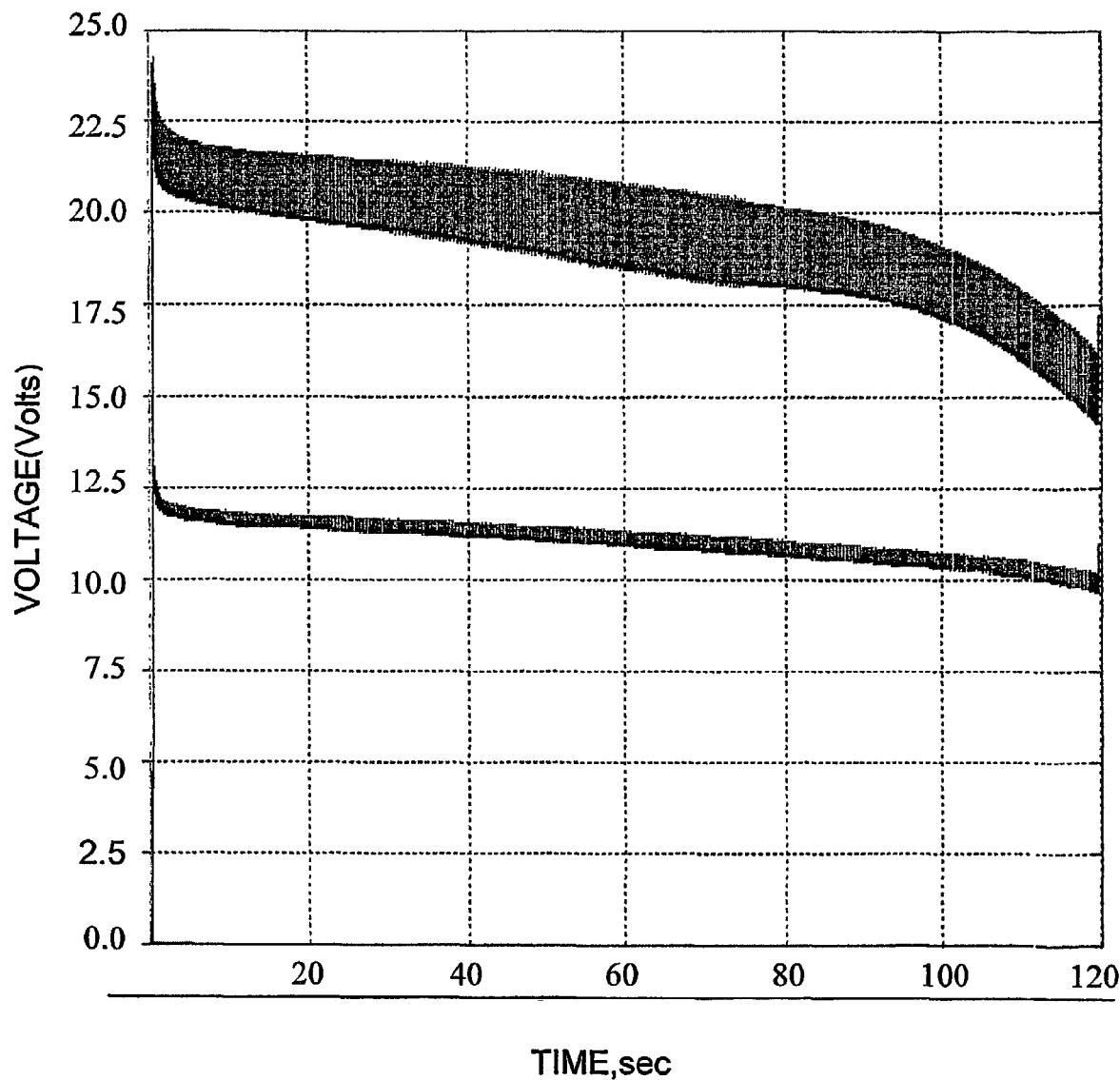
FIGS. 3 and 4 show discharge behavior of cold and hot conditioned thermal batteries, respectively, using the anodes of the present invention. More specifically, FIGS. 3 and 4 demonstrate typical output voltage obtained from the discharge of thermal batteries assembled with anodes of the present invention. The conditioned temperatures are −54° C. and +71° C.
Figure 4:
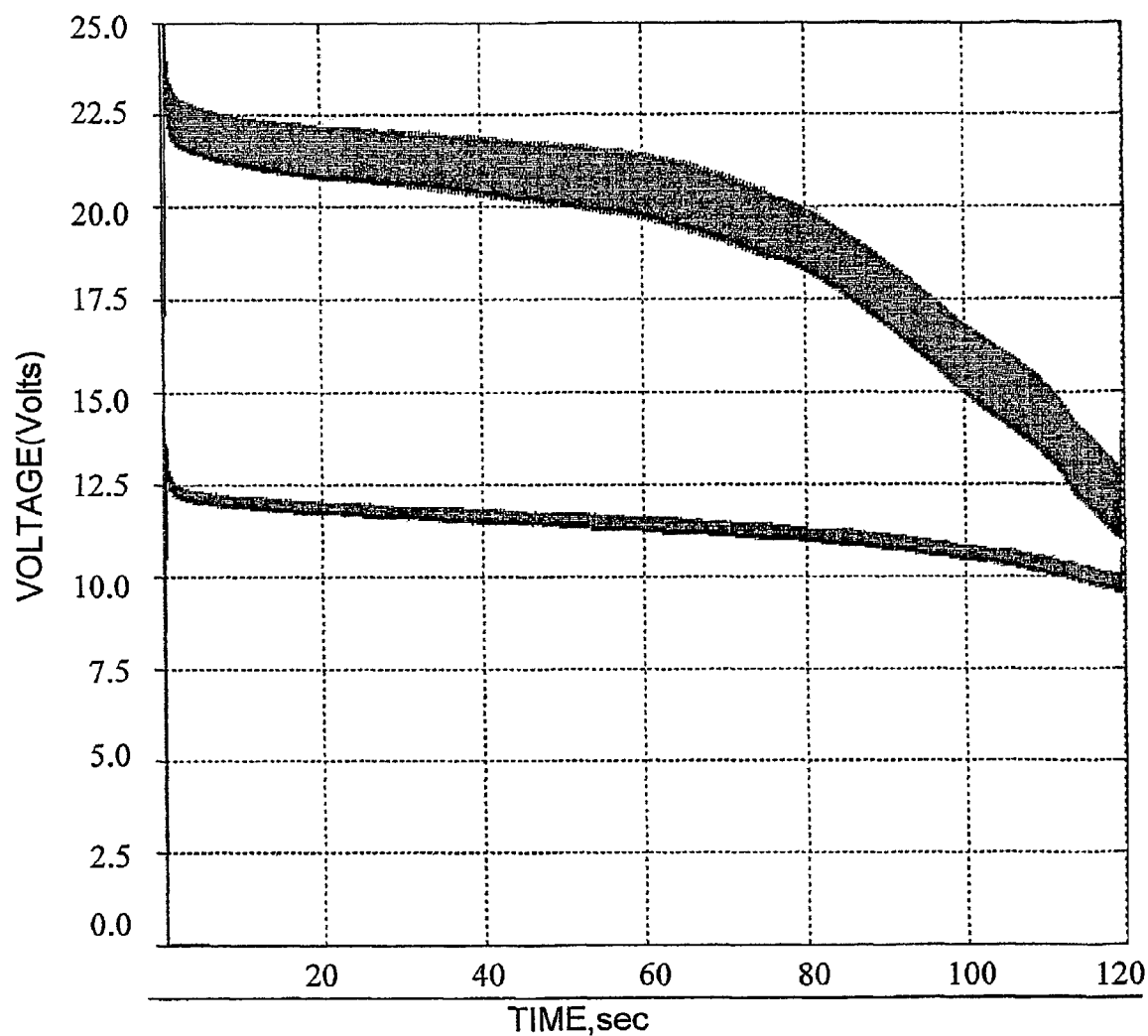
Figure 5:
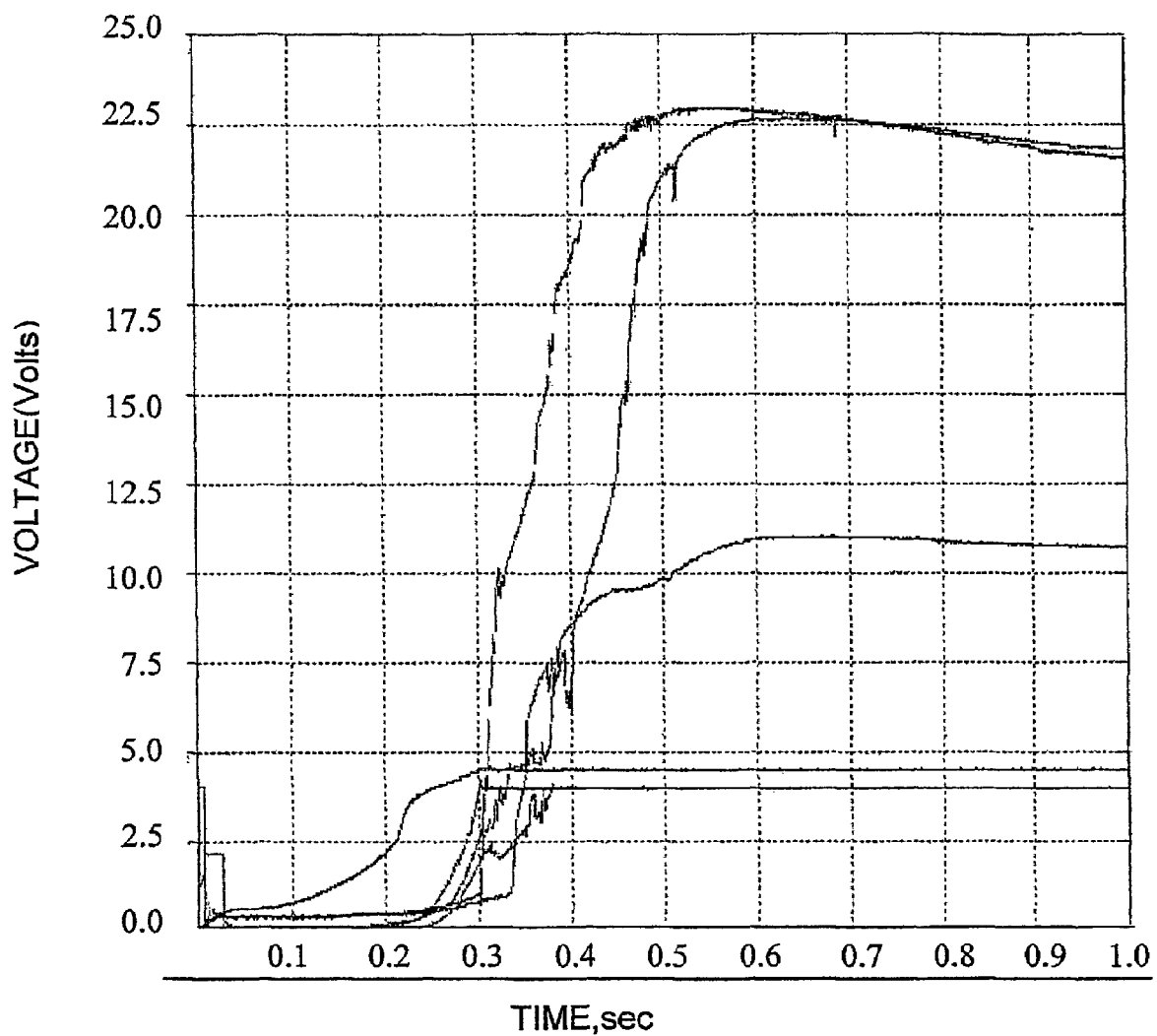
FIGS. 5 and 6 show activation noise during first second discharge of cold conditioned thermal batteries assembled with the anodes of the prior art, U.S. Pat. No. 4,675,257 (FIG. 5), and anodes of the present invention (FIG. 6). The three upper curves represent the output voltage obtained during batteries activation. A noise was observed in FIG. 5 while in FIG. 6 the activation is noiseless and smooth.
Figure 6:
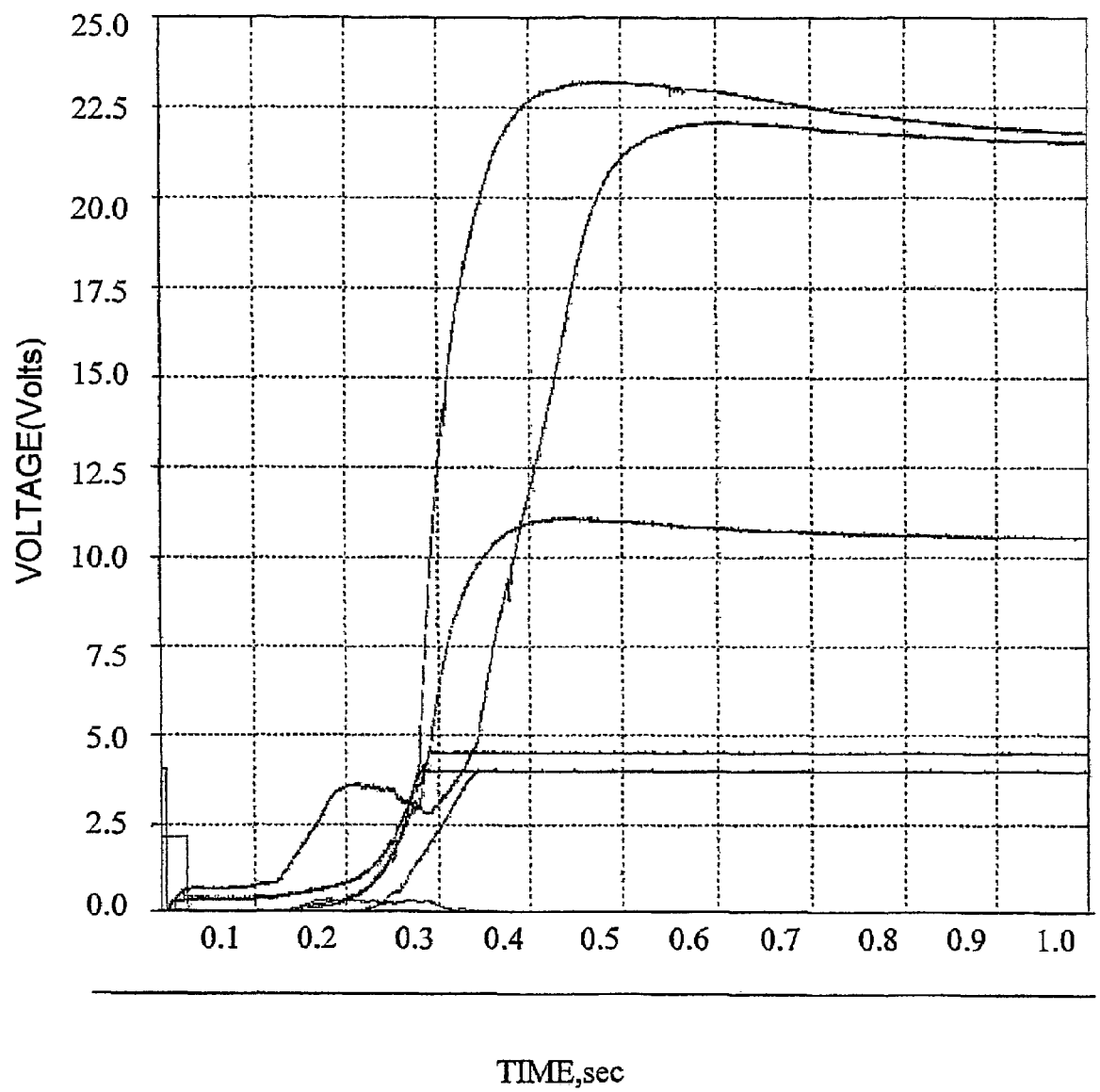

About 140-200 gr of lithium in ingot form (99.9%, battery grade, FMC Corp. Lithium Division, NC, USA) or strip form (99.9%, battery grade, Tadiran, Battery Division, Israel) were introduced in a previously heated iron pot. After melted at 300° C.-400° C., 0.2-20 gr of −200+325 mesh lithium-aluminum powder (20 wt % Li, Chemetall Foote Mineral Co., NC, USA) or −40+325 mesh aluminum powder (99.8%, Alfa Aesar, USA) was added. Following 50 min of continuous stirring, 580-1050 gr of vacuum dried −200 mesh iron powder (TX-1000, Pfizer Overseas Inc., NY, USA; AS-1000, Rafael, Israel) was gradually added to the melt during continuous stirring. After stirring for about 30 min to 1 hour, an homogeneous mixture was obtained.

The mixture was cast into previously heated graphite molds and permitted to cool. After the composite material has cooled it was removed from the mold as an ingot. After protective mineral oil (Silicaid AP-200, Aidchim Ltd., Israel) was applied to the ingots surface, they were transferred to a dry-room (<1% humidity) where they rolled and shaped into anodes. With exception of rolling and shaping steps, the entire process was carried out in an argon purified system (Vacuum/Atmospheres Company, CA, USA) maintaining the total partial pressure of nitrogen and oxygen bellow 10 ppm (generally 1 ppm).

In the following example 1, lithium nitride was added during the process for production of a known pyrometallurgically combined Li—Fe anode as described in the U.S. Pat. No. 4,675,257 (defined hereinafter as "prior art") and during the process for production of the new anode composite of present invention. The number of nitrided anodes that were found after defined aging period, was determined and compared.

It was found that the number of nitrided anodes was significantly lower with the new anode of present invention.

Example 1

Prior art: 145 gr Li (ingot form)+1.8 gr Li$_3$N powder+683 gr Fe (NX-1000) were treated, as described in the U.S. Pat. No. 4,675,257. A small quantity of lithium nitride (−80 mesh powder, Aldrich, USA) was added to simulate infected raw lithium. The resultant ingots were rolled and shaped into 38 anodes of 0.25 gr weight and 25 mm diameter.

The process of present invention: 151 gr Li (ingot form)+1.8 gr Li$_3$N powder+20 gr LiAl+711 gr Fe (NX-1000) were treated as described above for the process of present invention. A small quantity of lithium nitride was added to simulate infected raw lithium. The resultant ingots were rolled and shaped into 45 anodes of 0.25 gr weight and 25 mm diameter.

Results: All anodes were aged during 32 days at 70° C. in an oven open to the dry-room atmosphere. After the aging period, 42% of anodes made according to the prior art were nitrided while none of anodes made according to the present invention were nitrided.

Example 2

Prior art: 149 gr Li (nitrided ingots)+679 gr Fe (NX-1000) were treated as described in the U.S. Pat. No. 4,675,257. The resultant ingots were rolled and shaped into 260 anodes of 0.36 gr weight and 30 mm diameter.

The process of present invention—A: 149 gr Li (nitrided ingots)+25 gr LiAl+680 gr Fe (NX-1000) were treated as previously described. The resultant ingots were rolled and shaped into 286 anodes of 0.36 gr weight and 30 mm diameter.

The process of present invention—B: 207 gr Li (strip form)+35 gr LiAl+943 gr Fe (NX-1000) were treated as previously described. The resultant ingots were rolled and shaped into 207 anodes of 0.36 gr weight and 30 mm diameter.

Results: All anodes were aged at 70° C. in a furnace open to the dry-room atmosphere. Table 1 summarizes the aging results.

TABLE 1

Aging results of example 2.

| | | Number of nitrided anodes found during aging | |
| Aging period, days | Prior art | Present invention A | Present invention B |
| --- | --- | --- | --- |
| 1 | 0 | 0 | 0 |
| 24 | 3 | 0 | 0 |
| 31 | 10 | 1 | 0 |
| 50 | (7%) 18 | (0.7%) 2 | (0%) 0 |

Example 3

Prior art: 100 gr Li (strips)+420 gr Fe (AS-1000) were treated as described in the U.S. Pat. No. 4,675,257. The resultant ingots were rolled and shaped into 100 anodes of 0.36 gr weight and 30 mm diameter.

The process of present invention—A: 150 gr Li (strips)+ 25 gr LiAl+630 gr Fe (AS-1000) were treated as previously described. The resultant ingots were rolled and shaped into 100 anodes of 0.36 gr weight and 30 mm diameter.

The process of present invention—B: 150 gr Li (strips)+ 20 gr Al powder+630 gr Fe (AS-1000) were treated as previously described. The resultant ingots were rolled and shaped into 100 anodes of 0.36 gr weight and 30 mm diameter.

Results: All anodes were aged at 70° C. in a furnace open to the dry-room atmosphere. Table 2 summarizes the aging results.

TABLE 2

Aging results of example 3.

| Aging period, days | Number of nitrided anodes found during aging | | |
|---|---|---|---|
| | Prior art | Present invention A | Present invention B |
| 1 | 0 | 0 | 0 |
| 21 | — | 0 | 0 |
| 40 | (100%) 100 | (0%) 0 | (4%) 4 |

Case A (Li—Al) shows better resistance to the nitrogen attack compared to Case B (Al powder). This difference in resistance between both cases is probably originated from a better dissolution properties of Li—Al in lithium, compared to aluminum powder.

Example 4

Prior art: 200 gr Li (strips)+1050 gr Fe (AS-1000) were treated as previously described. The resultant ingots were rolled into 0.3 mm thickness, 60 mm width composite strips.

The process of present invention—A: 200 gr Li (strips)+ 11 gr LiAl+1050 gr Fe (AS-1000) were treated as previously described. The resultant ingots were rolled into 0.3 mm thickness, 60 mm width composite strips.

The process of present invention—B: 200 gr Li (strips)+ 22 gr LiAl+1050 gr Fe (AS-1000) were treated as previously described. The resultant ingots were rolled into 0.3 mm thickness, 60 mm width composite strips.

The process of present invention—C: 200 gr Li (strips)+ 33 gr LiAl+1050 gr Fe (AS-1000) were treated as previously described. The resultant ingots were rolled into 0.3 mm thickness, 60 mm width composite strips.

Results: All strips were aged at 70° C. in a furnace open to the dry-room atmosphere. Strips made according to the prior art were nitrided after 1 day aging. Strips made according to the present invention—A were nitrided after 2 days aging. In contrast, strips made according to the present invention—B and present invention—C were not nitrided even after more than 60 days aging.

In this example, cases A, B and C represent a use of different amounts of Li—Al (11, 22 and 33 gr, respectively).

It was found that in case A, the amount of Li—Al added was too small for protecting the anode of nitrogen attack. However, the amounts of Li—Al added in cases B and C, were higher and, consequently, have provided a much better protection of the anode against nitrogen attack. In cases B and C, the anodes withstood nitrogen attack for more than 60 days aging.

The invention claimed is:

1. A solid anode composite material containing lithium, for use in batteries having longer shelf life, said composite material solidified from a melt obtained at a temperature of about 300-400° C., comprising:
   (a) about 65-85% by weight a metal chosen from iron and nickel;
   (b) about 15-35% by weight lithium; and
   (c) about 0.1-10% by weight aluminum;
   said aluminum essentially removing lithium nitride from said composite material, and blocking the formation of lithium nitride in said composite material.

2. A solid anode composite according to claim 1, wherein said aluminum comprised in a powder prior to said composite being solidified.

3. A solid anode composite according to claim 1, wherein said metal is iron, said iron being in the form of powder prior to said composite being solidified.

4. A thermal battery comprising a solid composite anode as defined in any one of claims 1 to 3.

5. A thermal battery according to claim 4, exhibiting a reduced noise level during thermal activation.

6. A thermal battery according to claim 4, exhibiting a prolonged storage life without the reduction in voltage and without its anode being nitrided.

7. A thermal battery according to claim 4, exhibiting essentially the highest potential that a lithium-based anode can provide.

8. A method for production of a solid anode composite as defined in claim 1, comprising:
   (a) providing an inert atmosphere;
   (b) introducing lithium into molds and allowing the lithium to melt;
   (c) allowing a metal capable of forming a nitride compound thermodynamically more stable than lithium nitride, said metal being aluminum in a powder form, to mix with said molten lithium and to react with lithium nitride impurities at a temperature of about 300-400° C. without filtering the melt;
   (d) allowing a metal chosen from among iron and nickel, in a powder form, to mix with said melt in (c) at a temperature of about 300-400° C.;
   (e) allowing the composite in (d) to cool, followed by separation of the anode composite in the form of an ingot from said molds;
   (f) optionally applying a protective coat to the surface of the ingot in a conventional way; and
   (g) rolling and shaping the anode into the desired shape.

9. A method according to claim 8, wherein steps (a) to (f) are carried out in an argon purified system, wherein the total partial pressure of nitrogen and oxygen is maintained bellow 50 ppm, preferably 10 ppm, and more preferably 1 ppm.

10. A method according to claims 8, wherein said aluminum is provided in the form of a lithium-aluminum powder.

* * * * *